No. 635,846. Patented Oct. 31, 1899.
J. R. DICE.
SPIKE.
(Application filed Nov. 16, 1896.)
(No Model.)

Witnesses:
Walter Famariss
Robert C. Totten

Inventor:
John R. Dice
By Kay & Totten
Attorneys.

UNITED STATES PATENT OFFICE.

JOHN R. DICE, OF ALLEGHENY, PENNSYLVANIA.

SPIKE.

SPECIFICATION forming part of Letters Patent No. 635,846, dated October 31, 1899.

Application filed November 16, 1896. Serial No. 612,257. (No model.)

*To all whom it may concern:*

Be it known that I, JOHN R. DICE, a resident of Allegheny, in the county of Allegheny and State of Pennsylvania, have invented a new and useful Improvement in Spikes; and I do hereby declare the following to be a full, clear, and exact description thereof.

My invention relates to spikes, its object being to provide a spike which will take a very tenacious hold upon the fibers of the wood and one which will maintain its position against severe jars and pulls, which tend to draw the spike from its place.

To these ends my invention comprises, generally stated, a spike with a barbed shank, said barbs preferably extending beyond the main body of the shank, the width of said shank increasing above the barbs, so that when the spike is driven into the wood the wider portion of the shank will fill up the ragged opening made by the entrance of the barbs into the wood, and thus prevent water from finding its way down into the incisions made by the barbs and the consequent rotting of the timber.

To enable others skilled in the art to make and use my invention, I will describe the same more fully, referring to the accompanying drawings, in which—

Figure 1:
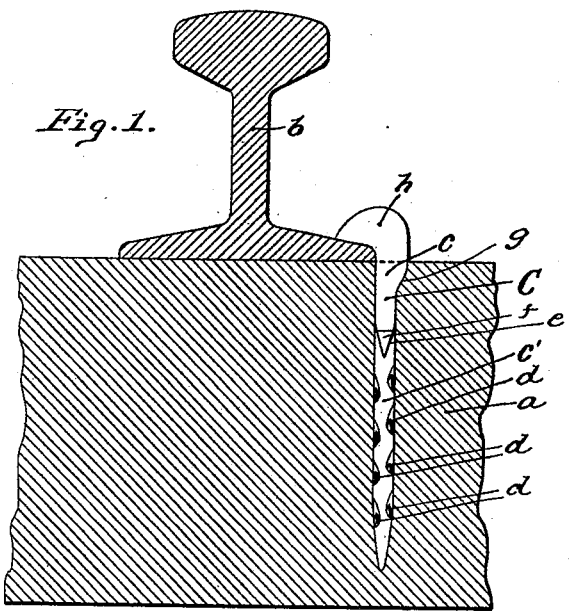
Figures 2, 3, 4:
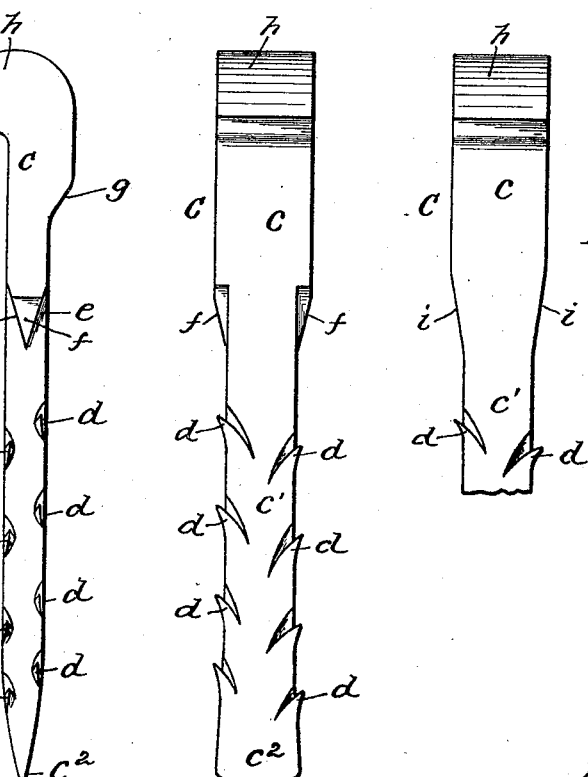

Figure 1 is a cross-sectional view of a railroad-rail resting on a tie, with one of my improved spikes driven into the tie to hold the rail in position. Fig. 2 is a side view of one of my improved spikes. Fig. 3 is a front view, and Fig. 4 is a modified form.

Like letters of reference indicate like parts in each view.

The letter $a$ designates a portion of a railroad-tie with the rail $b$ (shown in section) resting thereon.

The spike C has its shank divided into two portions $c$ $c'$. The lower portion $c'$ is narrower than the upper portion $c$ and has the barbs $d$ formed thereon, the barbs being preferably arranged as shown, "breaking joint" with each other, as it may be said. The points of the barbs preferably extend beyond the body of the shank $c'$, and said barbs may be formed in any suitable manner. The lower end of the shank $c'$ widens out, as at $c^2$, so that the shank at its lower end extends out even with the barbs and has the sharpened ends.

The upper square portion $c$ of the spike has its front and rear faces wide enough to extend beyond the points of any of the barbs, and in order that said square portion may more readily penetrate the wood the front and rear faces of said portion $c$ have the inclined faces $e$, while the sides are also inclined, as at $f$, so that the increased width of the upper portion of the spike is made gradual, and the spike is thus driven with greater facility. The upper end of the spike has the enlargement $g$ formed thereon for the purpose hereinafter set forth. The spike is provided with the ordinary head $h$, adapted to engage with the flange of the rail.

In Fig. 4 I have illustrated a modified form of my invention, in which the inclined faces $f$ on the front and back of the spike are omitted, while the inclines $i$ on the sides of the spike make the gradual enlargement from the lower portion $c'$ to the upper portion $c$.

In driving my improved spike the barbed portion $c'$ will enter the wood first and the barb extending beyond the body of the shank will tend to cut into the fiber of the tie and to a certain extent form a rough passage in its descent, which passage unless it were closed up by a larger body following after would leave small cavities in the tie, into which water might have access and which would eventually rot the tie. However, after the barbed portion $c'$ has passed below the top surface of the tie the wider portion $c$, following after, fills up any channels for the passage of water into the body of the tie. The inclined faces $e$ and $f$ permit the wider portion $c$ to enter the tie without difficulty. When the spike is within a short distance of being driven to its full length, so that the head $h$ will engage with the flange, the enlarged portion $g$ enters the wood and tends to force the head over toward the flange, so that a very close connection of the head with the flange is made.

By having the lower end of the barbed shank of the spike formed slightly wider, as at $c^2$, a passage is formed which prevents the barbs from cutting the wood too severely as they pass down into the tie.

It is apparent that a spike constructed according to my invention will not only be sufficiently strong for all practical purposes, but will at the same time have the advantage of clenching the wood in such a way that the spike can only be withdrawn with great difficulty. Every tendency of the spike to be withdrawn by the jars of the rail will be resisted by the barbs catching in the wood, while at the same time the wider portion c of the shank will prevent the water from gaining access to the space occupied by the barbs.

What I claim as my invention, and desire to secure by Letters Patent, is—

1. A spike having barbs formed on the lower portion of its shank, the upper portion of said shank having its front and rear faces wide enough to extend beyond the points of all of said barbs, said front and rear faces having the inclined faces e, substantially as set forth.

2. A spike having barbs formed on the lower portion of its shank, the upper portion of said shank having its front and rear faces wide enough to extend beyond the points of all of said barbs, said front and rear faces having the inclined faces e and the sides having the inclined faces f, substantially as set forth.

In testimony whereof I, the said JOHN R. DICE, have hereunto set my hand.

JOHN R. DICE.

Witnesses:
ROBT. D. TOTTEN,
ROBERT C. TOTTEN.